(12) United States Patent
Lee

(10) Patent No.: US 9,239,650 B2
(45) Date of Patent: Jan. 19, 2016

(54) CURVED TOUCH DISPLAY APPARATUS FOR PROVIDING TACTILE FEEDBACK AND METHOD THEREOF

(71) Applicant: Hyundai Motor Company, Seoul (KR)

(72) Inventor: Jong Bok Lee, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/100,942

(22) Filed: Dec. 9, 2013

(65) Prior Publication Data

US 2015/0084929 A1   Mar. 26, 2015

(30) Foreign Application Priority Data

Sep. 25, 2013  (KR) .................. 10-2013-0114052

(51) Int. Cl.
*G06F 3/042* (2006.01)
*G06F 3/01* (2006.01)

(52) U.S. Cl.
CPC .............. *G06F 3/0425* (2013.01); *G06F 3/016* (2013.01); *G06F 2203/014* (2013.01)

(58) Field of Classification Search
None
See application file for complete search history.

(56) References Cited

U.S. PATENT DOCUMENTS

| 2009/0267921 A1* | 10/2009 | Pryor ........................... 345/177 |
| 2012/0229407 A1 | 9/2012 | Harris et al. |
| 2015/0009168 A1* | 1/2015 | Levesque et al. ............. 345/174 |

FOREIGN PATENT DOCUMENTS

| JP | 2007-223416 A | 9/2007 |
| KR | 10-2009-0116544 A | 11/2009 |
| KR | 10-2010-0033658 A | 3/2010 |
| KR | 10-2012-0118280 A | 10/2012 |
| KR | 10-2013-0064003 A | 6/2013 |
| KR | 10-1275386 B1 | 6/2013 |

* cited by examiner

*Primary Examiner* — Joseph Haley
*Assistant Examiner* — Ifedayo Iluyomade
(74) *Attorney, Agent, or Firm* — McDermott Will & Emery LLP

(57) ABSTRACT

A curved touch display apparatus for providing tactile feedback is provided. The curved touch display comprises a curved screen, in which an image is displayed; and a projector including an infrared irradiator for irradiating infrared rays to the curved screen. An infrared camera photographs an infrared image reflected from the curved screen. An ultrasonic wave array module includes a plurality of ultrasonic wave generators which generate airborne ultrasonic waves. A controller determines a touched point on the curved screen based on the infrared image, and controls an operation of the ultrasonic wave array module to generate airborne ultrasonic waves directed to the touched point.

5 Claims, 3 Drawing Sheets

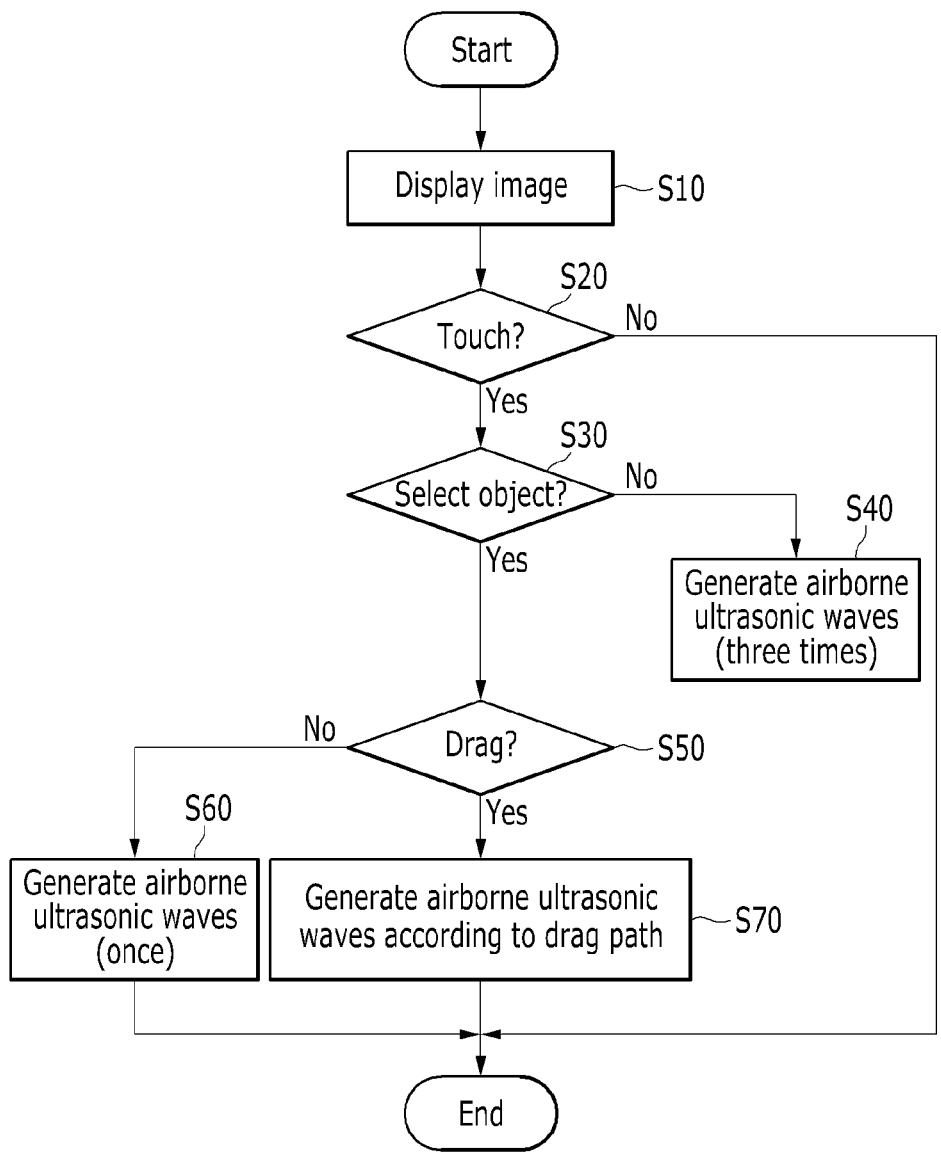

CURVED TOUCH DISPLAY APPARATUS FOR PROVIDING TACTILE FEEDBACK AND METHOD THEREOF

CROSS-REFERENCE TO RELATED APPLICATION

This application claims priority to and the benefit of Korean Patent Application No. 10-2013-0114052 filed in the Korean Intellectual Property Office on Sep. 25, 2013, the entire contents of which are incorporated herein by reference.

TECHNICAL FIELD

The present disclosure relates to a curved display apparatus. More particularly, the present disclosure relates to a curved display apparatus for providing tactile feedback.

BACKGROUND

Various input devices, such as a keypad, a jog dial, and a touch screen, have been used to control various functions of a vehicle. Recently, attempts have been made to apply a touch display apparatus to a cluster or an audio-video-navigation (AVN) system in order to improve a user's operating touch and a vehicle design. Research has been done on applying a rear surface projection type of touch display apparatus to curved surfaces in a vehicle. The rear surface projection type of touch display apparatus uses a projector which is disposed in a rear surface of a screen to project an image.

Conventional touch display apparatuses using infrared include a display device for displaying an image, an infrared irradiator for irradiating infrared rays to an image displaying part, and an infrared camera for sensing the infrared rays reflected from the image displaying part.

As the display apparatus included in the conventional touch display apparatus using infrared rays, a screen display apparatus for displaying an image on a screen by using a projector and a liquid crystal display (LCD) apparatus including a liquid crystal panel for displaying the image using a liquid crystal and a back light unit for irradiating light to the liquid crystal panel have been used.

However, if feedback is not provided to a user when the user operates the touch display apparatus, the user needs to keep an eye on the screen. As a result, in a case of the touch display apparatus mounted in the vehicle, if feedback corresponding to a touch is not provided, a driver's gaze may be distributed.

The conventional touch display apparatus provides tactile feedback using a motor or a piezoelectric element. However, in a case of using the motor, there are problems in that noise is generated according to a driving of the motor, and therefore marketability is deteriorated. In a case of using the piezoelectric element, the piezoelectric element should be made of a transparent material to use the projector. However, the cost is high for such transparent materials.

The above information disclosed in this Background section is only for enhancement of understanding of the background of the disclosure and therefore it may contain information that does not form the prior art that is already known in this country to a person of ordinary skill in the art.

SUMMARY

The present disclosure provides a curved touch display apparatus for providing tactile feedback having advantages of providing tactile feedback using airborne ultrasonic waves.

An exemplary embodiment of the present disclosure provides a curved touch display apparatus for providing tactile feedback. The curved touch display includes: a curved screen, in which an image is displayed; and a projector including an infrared irradiator, which irradiates infrared rays to the curved screen. An infrared camera photographs an infrared image reflected from the curved screen. An ultrasonic wave array module includes a plurality of ultrasonic wave generators, which generate airborne ultrasonic waves. A controller determines a touched point on the curved screen based on the infrared image, and controls an operation of the ultrasonic wave array module to generate the airborne ultrasonic waves directed to the touched point.

The controller may control the operation of the ultrasonic wave array module to generate the ultrasonic waves according to a moving path, if the touched point moves on the curved screen.

The curved touch display apparatus may further include an application driver executing an application function according to a control instruction of the controller.

The image displayed on the curved screen may include a user interface configured with a plurality of selectable objects, and if the touched point is in a region excluding the plurality of objects, the controller may control the operation of the ultrasonic wave array module to generate airborne ultrasonic waves corresponding to a first number of times.

If the touched point corresponds to any one of the plurality of objects, the controller may control the operation of the ultrasonic wave array module to generate airborne ultrasonic waves corresponding to a second number of times, and generate a control instruction for driving an application function mapped to the selected object.

The curved screen may be installed in a dashboard of a vehicle.

An exemplary embodiment of the present disclosure provides a method for providing tactile feedback to a user by a curved touch display apparatus installed in a vehicle. The method includes irradiating infrared rays to a curved screen, and photographing an infrared image reflected from the curved screen. A touched point is determined based on the infrared image, and airborne ultrasonic waves are generated directed to the touched point.

The method may further include: determining whether the touched point moves on the curved screen; and generating the airborne ultrasonic waves according to a moving path if the touched point moves on the curved screen.

The irradiating infrared rays to the curved screen may include projecting an image.

The method may further include: determining whether the touched point corresponds to any one of a plurality of objects if the image includes a user interface configured with the plurality of selectable objects, generating the airborne ultrasonic waves corresponding to a first number of times if the touched point is in a region excluding the plurality of objects, and generating the airborne ultrasonic waves corresponding to a second number of times if the touched point corresponds to any one of the plurality of objects.

The method may further include generating a control instruction for driving an application function mapped to the selected object if the touched point corresponds to any one of the plurality of objects.

BRIEF DESCRIPTION OF THE DRAWINGS

FIG. 3 is a flowchart illustrating a method for providing tactile feedback according to an exemplary embodiment of the present disclosure.

DETAILED DESCRIPTION

Figure 1:
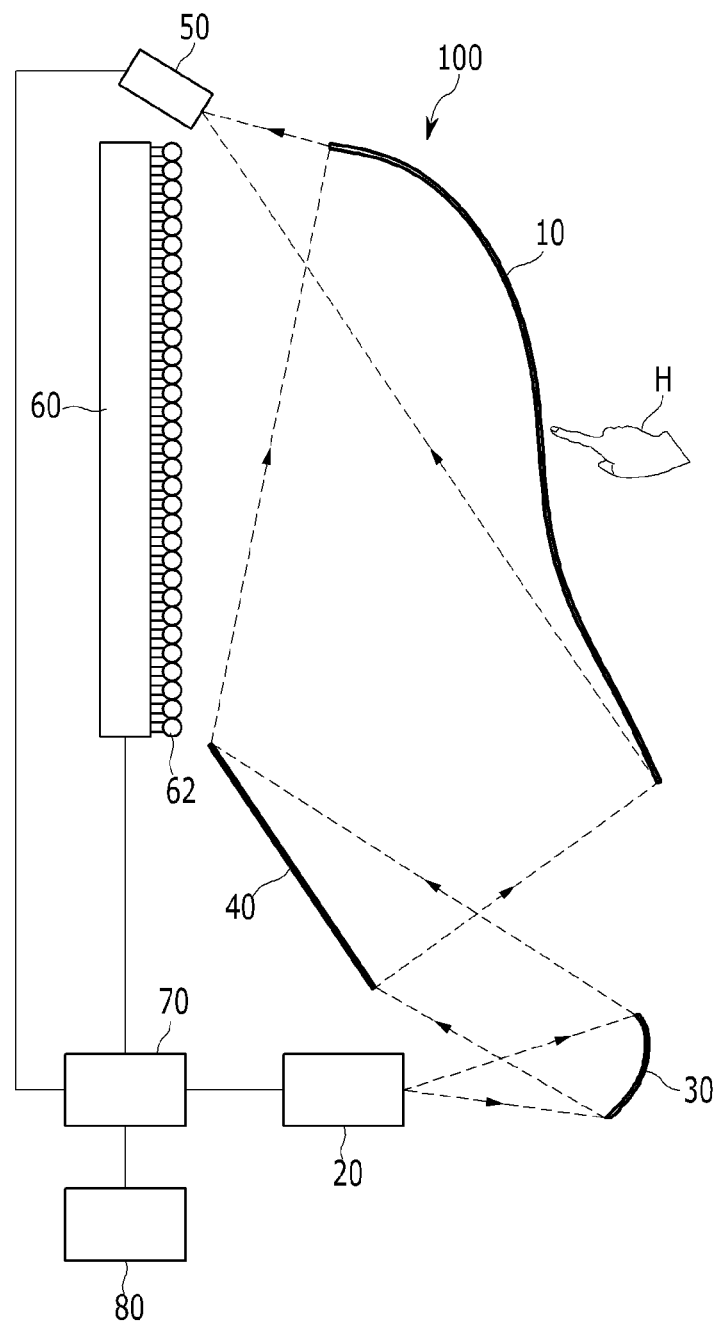
FIG. 1 is a schematic diagram of a curved touch display apparatus for providing tactile feedback according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Further, each configuration illustrated in the drawings is arbitrarily shown for better understanding and ease of description, but the present disclosure is not limited thereto.

FIG. 1 is a schematic diagram of a curved touch display apparatus for providing tactile feedback according to an exemplary embodiment of the present disclosure.

As shown in FIG. 1, a curved touch display apparatus 100 for providing tactile feedback according to an exemplary embodiment of the present disclosure includes a curved screen 10, in which an image is displayed: a projector 20 including an infrared irradiator, which irradiates infrared rays to the curved screen 10. An infrared camera 50 photographs an infrared image reflected from the curved screen 10. An ultrasonic wave array module 60 includes a plurality of ultrasonic wave generators 62 which generate airborne ultrasonic waves. A controller 70 determines a touched point on the curved screen 10 based on the infrared image and controls an operation of the ultrasonic wave array module 60 to generate airborne ultrasonic waves directed to the touched point.

The curved screen 10 may be installed in a dashboard of a vehicle according to an interior design of the vehicle.

The projector 20 projects the image to the curved screen 10. An aspherical mirror 30 and a reflection mirror 40 are disposed between the curved screen 10 and the projector 20. The image projected from the projector 20 is reflected to the reflection mirror 40 via the aspherical mirror 30. The image reflected from the reflection mirror 40 is projected to the curved screen 10 and then displayed to a user.

The aspherical mirror 30 may be manufactured according to a curvature value of the curved screen 10.

The infrared irradiator included in the projector 20 irradiates infrared rays to the curved screen 10. The infrared rays irradiated from the infrared irradiator are reflected to the reflection mirror 40 via the aspherical mirror 30. The infrared rays reflected from the reflection mirror 40 are irradiated to the curved screen 10.

When a user's hand H touches any point on the curved screen 10, the infrared camera 50 photographs the infrared image reflected from the curved screen 10.

The ultrasonic wave array module 60 includes the plurality of ultrasonic wave generators 62 which generate airborne ultrasonic waves. In a state that the user's hand H touches any point on the curved screen 10, when the airborne ultrasonic waves reach the curved screen 10, the user may detect a change in pressure. That is, tactile feedback is provided to the user by using an ultrasonic wave phenomenon called acoustic radiation pressure.

The controller 70 may be implemented with one or more microprocessors executed by a program. The program may include a series of commands for performing each step included in a method for providing tactile feedback according to an exemplary embodiment of the present disclosure to be described below.

The controller 70 determines a touched point based on the reflected infrared image. When the user's hand H touches any point on the curved screen 10, the controller 70 determines the touched point. The controller 70 controls an operation of the ultrasonic wave array module 60 to generate the airborne ultrasonic waves directed to the touched point. That is, controller 70 controls the operation of the ultrasonic wave array module 60 so that an ultrasonic wave generator corresponding to the touched point among the plurality of ultrasonic wave generators 62 may be operated.

Figure 2:
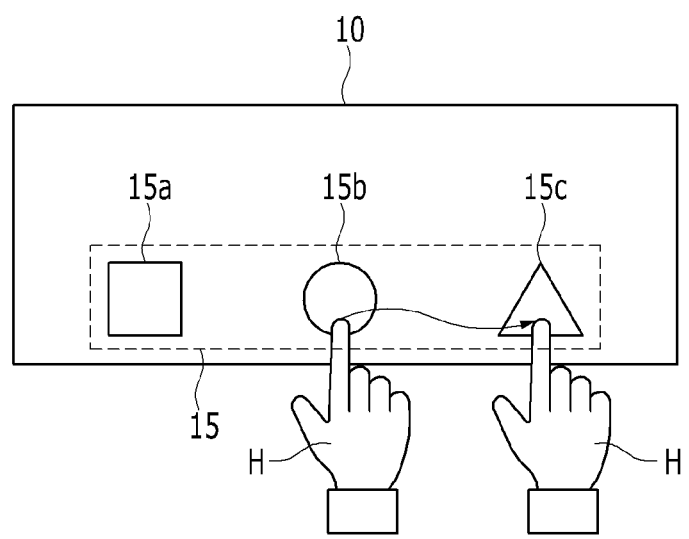
FIG. 2 is a conceptual diagram illustrating a curved screen according to an exemplary embodiment of the present disclosure.

FIG. 2 is a conceptual diagram illustrating a curved screen according to an exemplary embodiment of the present disclosure.

Referring to FIGS. 1 and 2, the image displayed on the curved screen 10 may include a user interface configured to display a plurality of objects 15 that are selectable.

Further, the curved touch display apparatus 100 for providing tactile feedback according to an exemplary embodiment of the present disclosure may further include an application driver 80 executing an application function according to a control instruction of the controller 70.

The user may select a desired object 15*b* among the plurality of objects 15 including objects 15*a*, 15*b*, and 15*c*. At this time, the controller 70 may generate the control instruction to operate an application function mapped to the selected object 15*b*, and output the control instruction to the application driver 80.

FIG. 3 is a flowchart illustrating a method for providing tactile feedback according to an exemplary embodiment of the present disclosure. Referring to FIG. 3, the projector 20 projects an image to the curved screen 10, and the image is displayed on the curved screen 10 at step S10. The infrared irradiator included in the projector 20 irradiates infrared rays, and the infrared camera 50 photographs the infrared image reflected from the curved screen 10.

The controller 70 determines whether the user touches the curved screen 10 based on the reflected infrared image at step S20. If the user touches the curved screen 10, the controller 70 determines a touched point. When the image displayed on the curved screen 10 includes the user interface configured to the plurality of objects 15 that are selectable, the controller 70 determines whether the touched point corresponds to any one of the plurality of objects 15 at step S30.

If the touched point is in a region excluding the plurality of objects 15, the controller 70 controls an operation of the ultrasonic wave array module 60 to generate the airborne ultrasonic waves corresponding to a first number of times at step S40. The first number of times can be arbitrarily set by a person of ordinary skill in the art, and may be, for example, three. This is to enable the user to receive feedback in a case in which the user touches the wrong point, and thereby the user can recognize whether the touched point is wrong through tactile feedback.

If the touched point corresponds to any one of the plurality of objects 15, the controller 70 determines whether the user performs a drag motion on the curved screen 10 at step S50. That is, the controller 70 determines whether the touched point continuously moves on the curved screen 10.

If the touched point does not move on the curved screen 10, the controller 70 controls an operation of the ultrasonic wave array module 60 to generate the airborne ultrasonic waves corresponding to a second number of times at step S60. The second number of times can be arbitrarily set by a person of ordinary skill in the art, and may be, for example, one. After that, the controller 70 drives an application function mapped to the touched object, and finishes the method for providing tactile feedback according to the exemplary embodiment of the present disclosure.

If the touched point moves on the curved screen 10 at the step S50, the controller 70 controls the operation of the ultrasonic wave array module 60 so that airborne ultrasonic waves are continuously or periodically generated according to a moving path at step S70. That is, when the user performs a drag motion to search contents, tactile feedback can be provided to the user according to a drag path (moving path). After that, the controller 70 drives an application function according to the drag motion, and finishes the method for providing tactile feedback according to the exemplary embodiment of the present disclosure.

Therefore, according to an exemplary embodiment of the present disclosure, as tactile feedback corresponding to a touch is provided, a user can determine whether the touch is normally recognized.

Further, as the tactile feedback is provided, forward observation of a driver while driving is improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A curved touch display apparatus for providing tactile feedback, the curved touch display apparatus comprising:
   a curved screen in which an image is displayed;
   a projector including an infrared irradiator which irradiates infrared rays to the curved screen;
   an infrared camera photographing an infrared image reflected from the curved screen;
   an ultrasonic wave array module including a plurality of ultrasonic wave generators which generate airborne ultrasonic waves;
   a controller determining a touched point on the curved screen based on the infrared image, and controlling an operation of the ultrasonic wave array module to generate the airborne ultrasonic waves directed to the touched point; and
   an application driver executing an application function according to a control instruction of the controller,
   wherein the image displayed on the curved screen comprises a user interface configured with a plurality of selectable objects, and if the touched point is in a region excluding the plurality of objects, the controller controls the operation of the ultrasonic wave array module to generate a first number of airborne ultrasonic waves, and
   wherein if the touched point corresponds to any one of the plurality of objects, the controller controls the operation of the ultrasonic wave array module to generate a second number of airborne ultrasonic waves, and generate a control instruction for driving an application function mapped to the selected object.

2. The apparatus of claim 1, wherein the controller controls the operation of the ultrasonic wave array module to generate the ultrasonic waves according to a moving path, if the touched point moves on the curved screen.

3. The apparatus of claim 1, wherein the curved screen is installed in a dashboard of a vehicle.

4. A method for providing tactile feedback to a user by a curved touch display apparatus installed in a vehicle, the method comprising:
   irradiating infrared rays to a curved screen,
   wherein the irradiating infrared rays to the curved screen comprises projecting an image;
   photographing an infrared image reflected from the curved screen;
   determining a touched point based on the infrared image;
   generating airborne ultrasonic waves directed to the touched point;
   determining whether the touched point corresponds to any one of a plurality of objects if the image comprises a user interface configured with the plurality of selectable objects;
   generating a first number of airborne ultrasonic waves if the touched point is in a region excluding the plurality of objects;
   generating a second number of airborne ultrasonic waves if the touched point corresponds to any one of the plurality of objects; and
   generating a control instruction for driving an application function mapped to the selected object if the touched point corresponds to any one of the plurality of objects.

5. The method of claim 4, further comprising:
   determining whether the touched point moves on the curved screen; and
   generating the airborne ultrasonic waves according to a moving path if the touched point moves on the curved screen.

* * * * *